May 12, 1953  C. L. WETSEL  2,638,336
SCALE FOR LIFT TRUCKS

Filed Sept. 9, 1950  3 Sheets-Sheet 1

INVENTOR
Cecil L. Wetsel
BY
ATTORNEYS

May 12, 1953 — C. L. WETSEL — 2,638,336
SCALE FOR LIFT TRUCKS
Filed Sept. 9, 1950 — 3 Sheets-Sheet 3
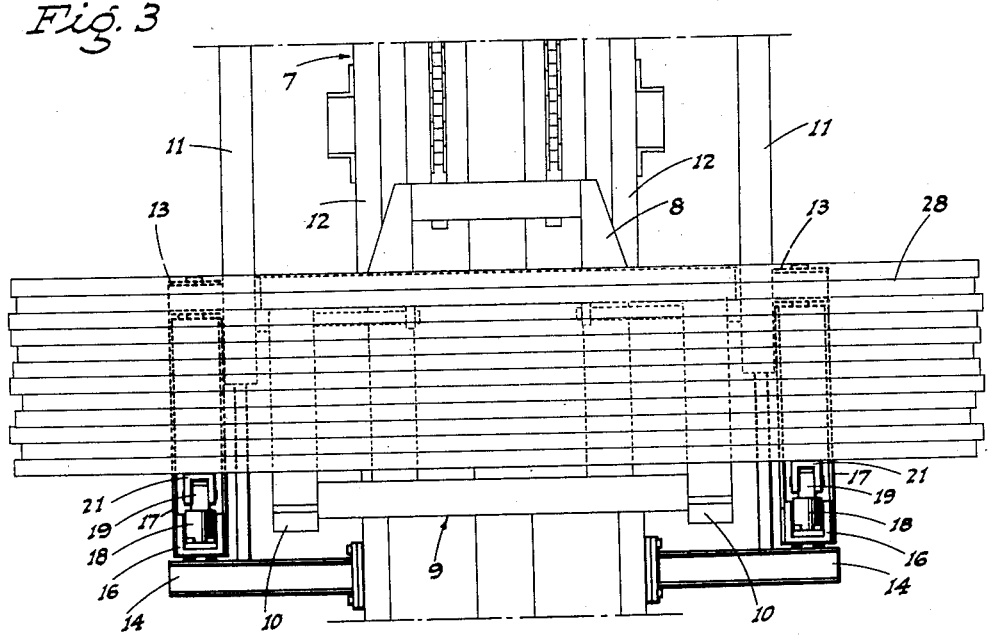
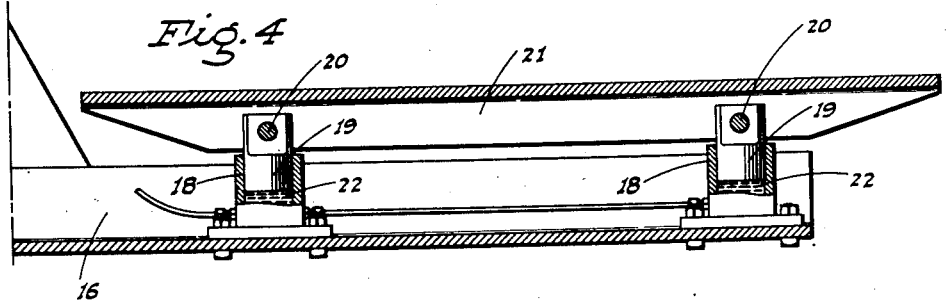
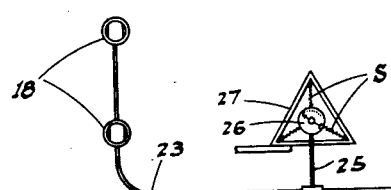
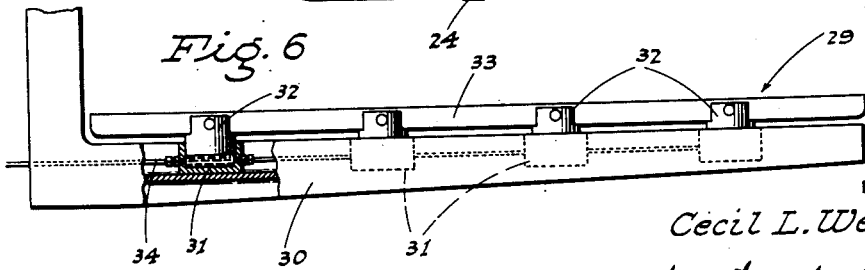
INVENTOR
Cecil L. Wetsel
BY
ATTORNEYS Patented May 12, 1953

2,638,336

UNITED STATES PATENT OFFICE 2,638,336

SCALE FOR LIFT TRUCKS

Cecil L. Wetsel, Sacramento, Calif.

Application September 9, 1950, Serial No. 183,969

8 Claims. (Cl. 265—40)

This invention is directed to, and it is an object to provide, a scale, for use in connection with a fork lift truck, to indicate the weight of the load as picked up by the forks.

A further object of the invention is to provide a scale, for the purpose described, which includes a plurality of hydraulic cylinders mounted in connection with the lift truck in a manner such that the load picked up by the forks may rest full weight on said cylinders to depress the same and cause a proportionate pressure therein; there being a fluid pressure gauge—calibrated in terms of weight—on the truck, and a fluid pressure conduit system connects between said cylinders and gauge. The scale thus reads in terms of the weight of the load.

Another object of the invention is to provide a scale, for lift trucks, which in one embodiment is mounted for selective use, and in another embodiment functions when each load is imposed on the forks.

An additional object of the invention is to provide, in said one embodiment, a pair of scale beam assemblies corresponding to the forks of the truck but swingably mounted for motion from a position clear of a fork-supported load to a position below the same so as to receive the load upon lowering of the forks; such scale beam assemblies including the hydraulic cylinders, as aforementioned.

A still further object of the invention is to incorporate the scale beam assemblies, in said other embodiment, directly in the lift forks of the truck, so that each load handled causes the scale to function.

It is also an object of the invention to provide a scale for lift trucks which is designed for ease and economy of manufacture; the scale being simple in structure but sturdy and reliable.

Still another object of the invention is to provide a practical scale for lift trucks, and one which will be exceedingly effective for the purpose for which it is designed.

Fig. 3 is a fragmentary front elevation of the truck and scale showing the latter as in use.

Fig. 4 is an enlarged, fragmentary sectional elevation of one of the scale beam assemblies.

Fig. 5 is a diagram of the fluid pressure conduit system between the hydraulic cylinders and weight calibrated gauge.

Fig. 6 is an enlarged fragmentary elevation of one fork of the truck in the embodiment wherein the scale beam assemblies are unitary with corresponding forks.

Figure 1:
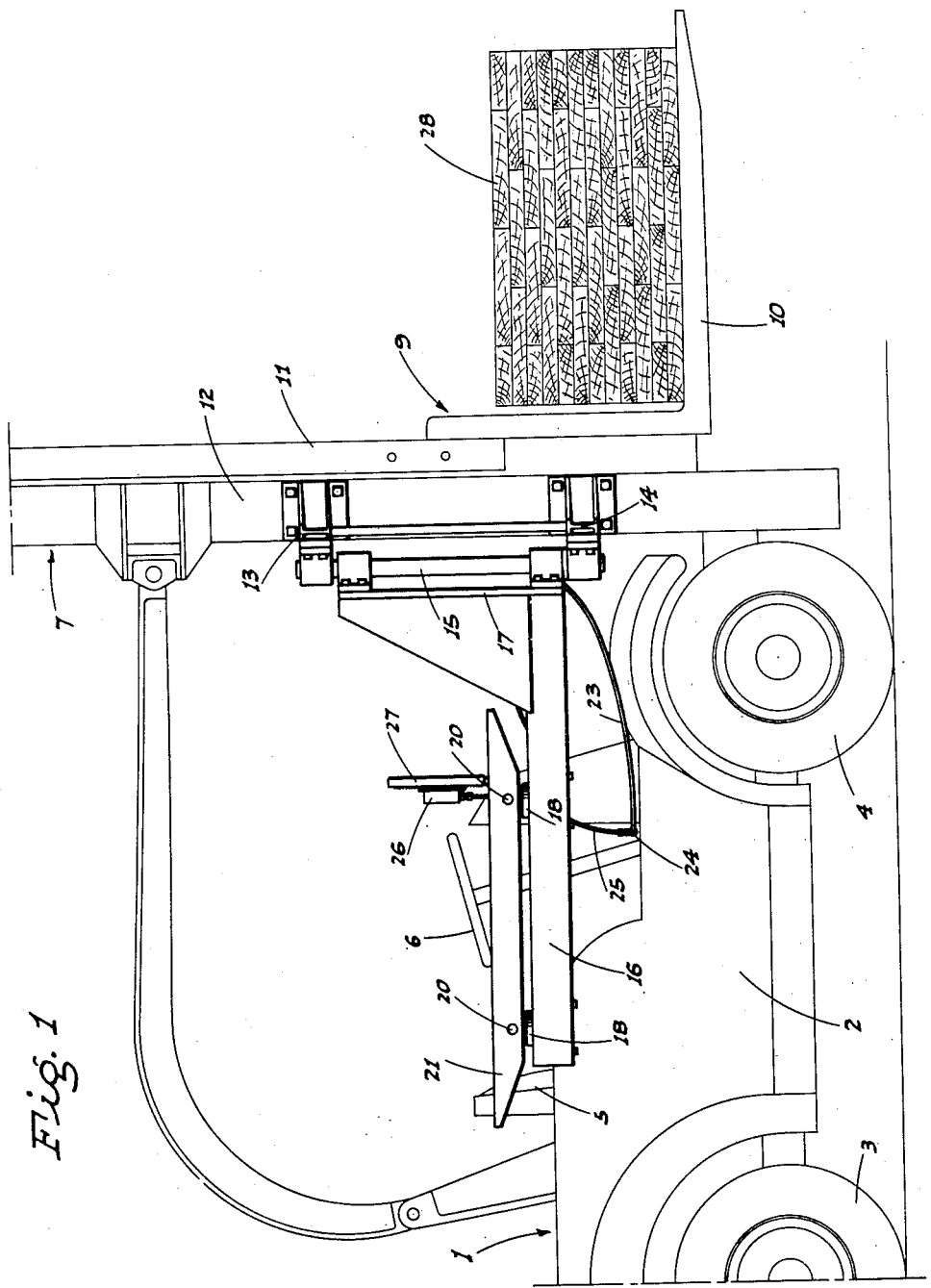
Fig. 1 is a side elevation of a lift truck fitted with the scale; the scale beam assemblies being swung to non-operating position.

Referring now more particularly to the characters of reference on the drawings, and at present to Figs. 1–5, inclusive, the numeral 1 indicates, generally, a fork lift truck; which truck includes a body 2, rear wheels 3, front wheels 4, an operator's seat 5; and a steering wheel 6.

At the front thereof the truck 1 includes a fork lift assembly comprised of an upstanding main frame 7 on which a power actuated elevator carriage 8 is mounted for up and down travel; such elevator carriage being fitted, at its lower end, with a load supporting unit, indicated generally at 9.

The load supporting unit 9 includes transversely spaced, forwardly projecting, load supporting forks 10, and upstanding, transversely spaced, load-back stop bars 11.

To the above described fork lift truck the following novel scale mechanism is applied:

Each vertical side beam 12 of the upstanding main frame 7 is fitted, adjacent but above the front wheels 4, with a pair of vertically spaced outrigger arms 13 and 14; said outrigger arms having a vertical pivot shaft 15 extending therebetween.

Figure 2:
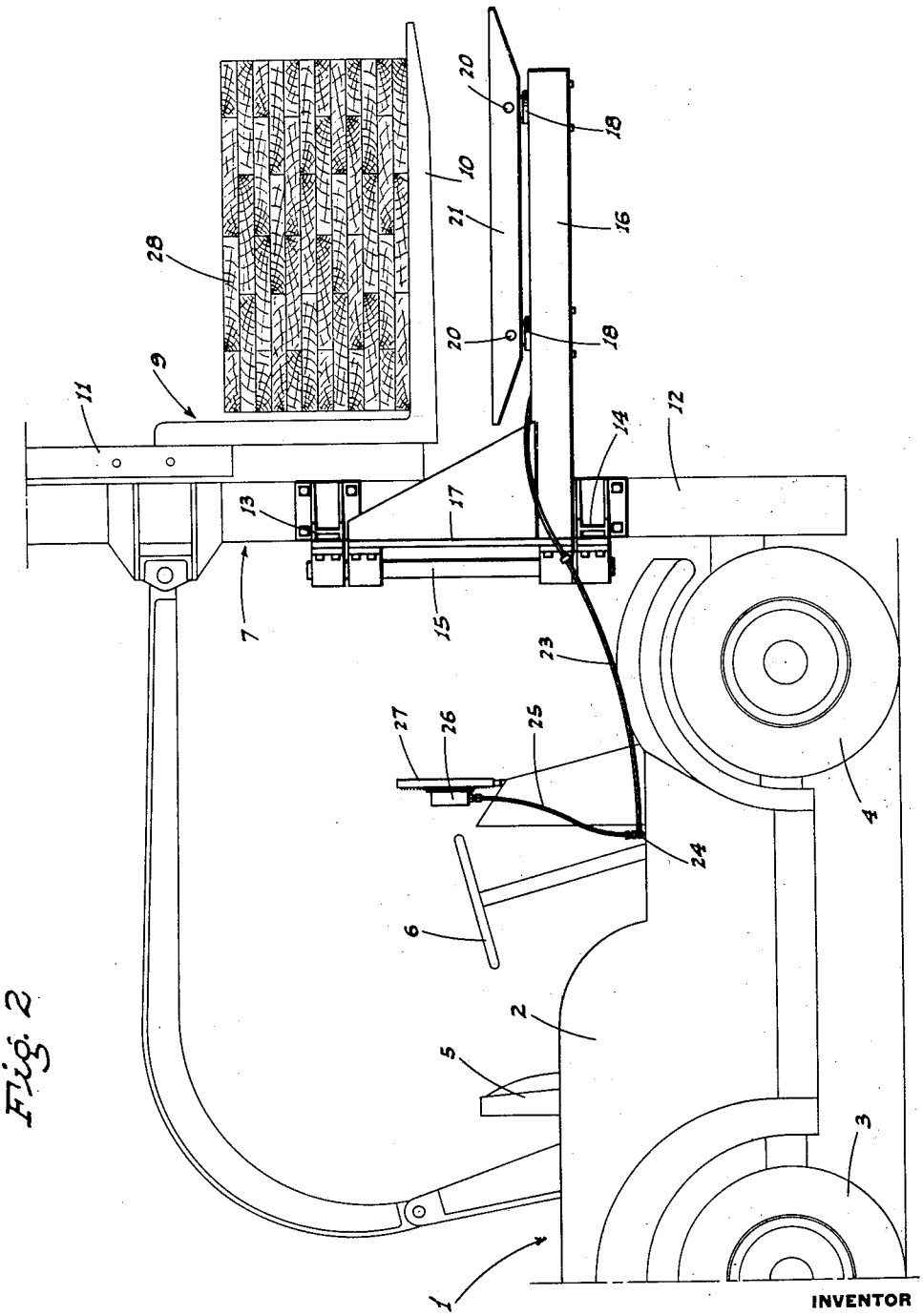
Fig. 2 is a similar view, but shows the scale as in use.

A horizontal beam 16 is swingably connected with each vertical pivot shaft 15 for swinging motion from a rearwardly projecting non-working position, as in Fig. 1, to a forwardly projecting working position, as in Fig. 2. Each swingable beam 16 includes a post 17 at its rear end which serves as the mount to vertically connect said beam to the corresponding vertical pivot shaft 15.

When the swingable beams 16 are in their rearwardly projecting, non-working position, they lie alongside the body 2 in an out-of-the-way position, which in no wise interferes with conventional operation of the fork lift truck, particularly the vertically movable load supporting unit 9.

Each swingable beam 16 is of upwardly opening channel configuration, and a plurality of hydraulic cylinders 18 are mounted in said beam, and each cylinder includes an upwardly projecting piston 19 which is connected, as at 20, to a scale beam 21 which extends horizontally in longitudinal alinement above the related swingable beam 16.

The hydraulic cylinders 18 each include a quantity of hydraulic fluid 22, and said cylinders are interposed, in series, in a conduit 23, at least in part flexible to permit of swinging of the beam 16 between non-working and working positions.

The conduits 23 lead rearwardly to a common fitting 24, and thence another conduit 25 leads upwardly from said fitting to a pressure gauge 26 disposed adjacent but ahead of the steering wheel 6.

The pressure gauge 26 is scaled or calibrated in terms of weight; such pressure gauge being supported in a shock-proof mount which comprises a fixed open frame or triangle 27 centrally in which the gauge is suspended by tension springs S.

When the scale is to be used a load 28 on the forks 10 is run upwardly on the main frame 7 to a point above the horizontal plane of the beams 16. Then such latter beams are swung forwardly from their non-working position to their working position, as in Figs. 1 and 2, respectively. In their working position the forwardly projecting beams 16 lie spaced apart a distance such that the load supporting forks may pass downwardly therebetween. To weigh the load 10, the elevator carriage 8 is run downwardly until such load rests on the beams 16 rather than the forks 10. See Fig. 3. With the parts in this position, and the load so supported, a pressure is created in the hydraulic cylinders 18 proportionate to the weight of the load, which pressure causes a response in the gauge 26; such gauge—being calibrated in terms of weight—then giving an accurate reading of the weight of the load 28.

After the load is weighed, it is again picked up by the forks 10, and the beams 16 are swung rearwardly to their non-working position, so that the truck 1 may continue with further handling of said load without interference.

With the described scale mechanism the weight of each load 28 picked up by the fork lift truck 1 can be accurately weighed, with the weight clearly indicated by the gauge 26 within the ready vision of the truck operator from the seat 5; the operator maintaining a written record, load by load, of the respective weights.

Under certain working conditions it is desirable that each and every load be weighed, and under such circumstance a scale beam assembly, indicated generally at 29, is directly mounted in connection with each of the forks 30, as shown in Fig. 6, of the truck.

In this embodiment each fork 30 is channeled, as shown, and a plurality of hydraulic cylinders 31 are mounted therein; said cylinders including upwardly projecting pistons 32 whose upper ends are connected to a longitudinally extending, horizontal scale beam 33.

As in the previous embodiment, the hydraulic cylinders 31 are connected in series in a conduit 34 which leads rearwardly to connection with a pressure gauge scaled in terms of weight.

In this embodiment, each time a load is imposed on the forks 30, the weight of such load—through the medium of the hydraulic cylinders 31—produces proportionate pressure in the conduit 31, actuating the pressure gauge to reflect the weight of such load.

The described scale mechanism, in either of its embodiments, provides a very practical and reliable device for indicating the weight of loads picked up by a fork lift truck.

From the foregoing description it will be readily seen that there has been produced such a device as substantially fulfills the objects of the invention, as set forth herein.

While this specification sets forth in detail the present and preferred construction of the device, still in practice such deviations from such detail may be resorted to as do not form a departure from the spirit of the invention, as defined by the appended claims.

Having thus described the invention, the following is claimed as new and useful, and upon which Letters Patent are desired:

1. A scale for a load lifting truck, comprising a pair of longitudinal members arranged to be projected outwardly in spaced relation beneath the load, scale beams above the members to receive the load thereon, fluid cylinders between the members and scale beams responsive to the weight of the load thereon, a pressure gauge calibrated in terms of weight, a fluid pressure conduit system between the fluid cylinders and the gauge, and a shock-resistant mount for the gauge, said mount comprising another frame fixed on the truck, and tension springs supporting the gauge within the confines of the frame.

2. A scale for a load lifting truck, comprising a pair of longitudinal members arranged to be projected outwardly in spaced relation beneath the load, scale beams above the members to receive the load thereon, fluid cylinders between the members and scale beams responsive to the weight of the load thereon, a pressure gauge calibrated in terms of weight, and a fluid pressure conduit system between the fluid cylinders and the gauge; the truck including an upstanding frame and a load lifting unit vertically movable thereon, and means mounting said members on the frame for swinging motion between a non-working position clear of the load and a working position beneath the same after lifting by said unit.

3. A scale for a fork lift truck which includes an upstanding frame, and an elevator carriage having spaced, forwardly projecting forks thereon; comprising a pair of spaced, scale beam assemblies, means mounting said scale beam assemblies for selective projection beneath and to support a load lifted by said forks, the scale beam assemblies including fluid pressure means responsive to the weight of the load thereon, a pressure gauge calibrated in terms of weight, and a conduit system connected between said fluid pressure means and the gauge.

4. A scale, as in claim 3, in which each scale beam assembly includes a beam mounted in connection with the upstanding frame for swinging motion between a non-working position clear of the load and a working position beneath the same after lifting by the forks.

5. A scale for a fork lift truck which includes an upstanding frame, an elevator carriage on the frame, and spaced forwardly projecting forks on the carriage; said scale comprising a pair of substantially horizontal beams, means pivotally mounting the beams at their inner ends in connection with corresponding sides of the upstanding frame for swinging between a rearwardly projecting non-working position and a forwardly projecting working position, the beams when in said last named position being disposed below a load lifted by the forks but clear of the path of the latter, fluid cylinders upstanding from the beams, a load platform on the cylinders above each beam, a pressure gauge calibrated in terms of weight, and a conduit system connecting between the fluid cylinders and gauge.

6. A scale, as in claim 5, in which said conduit system is flexible in part to permit the beams 7. A scale for a fork lift truck which includes an upstanding frame, an elevator carriage on the frame, and spaced forwardly projecting forks on the carriage; said scale comprising a pair of substantially horizontal beams, means pivotally mounting the beams at their inner ends in connection with corresponding sides of the upstanding frame for swinging between a rearwardly projecting non-working position and a forwardly projecting working position, the beams when in said last named position being disposed below a load lifted by the forks but clear of the path of the latter, fluid cylinders upstanding from the beams, a load platform on the cylinders above each beam, a pressure gauge calibrated in terms of weight, and a conduit system connecting between the fluid cylinders and gauge; said beam mounting means including outrigger arms projecting laterally from opposite sides of the upstanding frame, and pivotal connections between said outrigger arms and corresponding beams.

8. A scale for a fork lift truck which includes an upstanding frame, an elevator carriage on the frame, and spaced forwardly projecting forks on the carriage; said scale comprising a pair of substantially horizontal beams, means pivotally mounting the beams at their inner ends in connection with corresponding sides of the upstanding frame for swinging between a rearwardly projecting non-working position and a forwardly projecting working position, the beams when in said last named position being disposed below a load lifted by the fork but clear of the path of the latter, a plurality of upstanding fluid cylinders on each beam, a scale beam secured to and spanning between the cylinders on each first named beam, a pressure gauge calibrated in terms of weight, and a conduit system connecting between the fluid cylinders and gauge.

CECIL L. WETSEL.

References Cited in the file of this patent

UNITED STATES PATENTS

| Number | Name | Date |
|---|---|---|
| 923,240 | Bradford | June 1, 1909 |
| 1,098,197 | Walters et al. | May 26, 1914 |
| 1,165,714 | Ruckes | Dec. 28, 1915 |
| 1,329,684 | Troll | Feb. 3, 1920 |
| 2,020,307 | Fitch | Nov. 12, 1935 |
| 2,358,770 | Carliss | Sept. 19, 1944 |